DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 1, 1973

910 O.G. 7

T910,001
ELECTROPLATABLE POLYPROPYLENE OR POLYALLOMER COMPOSITION

William Williamson Blount, Jr., 1129 Oakleaf Drive, Kingsport, Tenn.

Continuation of application Ser. No. 17,899, Mar. 9, 1970. This application Jan. 13, 1972, Ser. No. 217,691
Int. Cl. C08f *3/08*
U.S. Cl. 260—23 H
No Drawing. 11 Pages Specification

This invention relates to polypropylene and polyallomer compositions having a flow rate of about 2 to 10 decigrams per minute, about 0 to 20% by weight of the composition of an inert filler and about 1 to 10% by weight of the composition of an organic epoxide or epoxy resin. It has been found that articles formed from these compositions can be readily etched and electroplated giving superior metal to substrate adhesion. A preferred embodiment includes 3 to 5% by weight of talc, clay, or silica fillers and 3 to 5% of epoxies such as epoxidized linseed oil, epoxidized tall oil ester, alicyclic diepoxy adipate, octyl epoxytallate, or the glycidyl ether of bisphenol-A. A phenolic stabilizer and a mold release agent such as calcium stearate may also be added. Articles having a metal coating of copper or nickel are prepared by first using a chemical electroless plating systems followed by electrolytic deposition of the metal.